United States Patent
Hu et al.

(10) Patent No.: US 9,563,936 B2
(45) Date of Patent: Feb. 7, 2017

(54) PIXEL-BASED METHOD AND APPARATUS OF OBTAINING DOWNSAMPLED IMAGE

(71) Applicant: Shenzhen China Star Optoelectronics Technology Co., Ltd., Shenzhen, Guangdong (CN)

(72) Inventors: Houliang Hu, Guangdong (CN); Hao Li, Guangdong (CN); Li-wei Chu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 179 days.

(21) Appl. No.: 14/395,519

(22) PCT Filed: Sep. 9, 2014

(86) PCT No.: PCT/CN2014/086126
§ 371 (c)(1),
(2) Date: Oct. 20, 2014

(87) PCT Pub. No.: WO2016/029511
PCT Pub. Date: Mar. 3, 2016

(65) Prior Publication Data
US 2016/0260198 A1    Sep. 8, 2016

(30) Foreign Application Priority Data

Aug. 27, 2014   (CN) .......................... 2014 1 0428124

(51) Int. Cl.
*G06T 3/40*    (2006.01)
*G06K 9/52*    (2006.01)
(Continued)

(52) U.S. Cl.
CPC ............... *G06T 3/4053* (2013.01); *G06K 9/52* (2013.01); *G06K 9/6201* (2013.01); *G06T 3/40* (2013.01); *G06T 7/0042* (2013.01)

(58) Field of Classification Search
None
See application file for complete search history.

(56) References Cited

U.S. PATENT DOCUMENTS

2005/0013509 A1* 1/2005 Samadani ............. G06T 3/4023
                                                            382/302
2009/0274380 A1* 11/2009 Wedi ..................... G06T 3/4007
                                                            382/233

(Continued)

OTHER PUBLICATIONS

Fang, Lu, et al. "Novel 2-D MMSE subpixel-based image downsampling." IEEE transactions on circuits and systems for video technology 22.5 (2012): 740-753.*

(Continued)

*Primary Examiner* — Zhengxi Liu
(74) *Attorney, Agent, or Firm* — Andrew C. Cheng

(57) ABSTRACT

Pixel-based method and apparatus of obtaining a downsampled image are provided. The method includes: constructing a virtual image by an image super-resolution technology according to a resolution of the downsampled image; determining relational expressions between pixels of the virtual image and pixels of the downsampled image; calculating a MSE between the pixels of the virtual image and pixels of the original image based on the relational expressions; determining a coefficient matrix between the pixels of the downsampled image and the pixels of the original image under the condition of the MSE being at a minimum value; determining the pixels of the downsampled image according to the pixels of the original image and the coefficient matrix; and outputting the downsampled image. Accordingly, the present invention can obtain sharp image and avoid color aliasing.

4 Claims, 8 Drawing Sheets

(51) Int. Cl.
*G06K 9/62* (2006.01)
*G06T 7/00* (2006.01)

(56) References Cited

U.S. PATENT DOCUMENTS

| | | | |
|---|---|---|---|
| 2010/0135588 A1* | 6/2010 | Au .......................... | G06T 3/403 |
| | | | 382/243 |
| 2010/0289816 A1* | 11/2010 | Au ........................ | G09G 5/026 |
| | | | 345/613 |
| 2011/0222770 A1* | 9/2011 | Au ........................ | G06T 3/4023 |
| | | | 382/173 |
| 2011/0254847 A1* | 10/2011 | Au ........................ | G06T 3/4023 |
| | | | 345/428 |
| 2013/0011078 A1* | 1/2013 | Phan ..................... | G06T 3/4053 |
| | | | 382/279 |
| 2013/0301949 A1* | 11/2013 | Springer ................... | G06T 5/00 |
| | | | 382/255 |

OTHER PUBLICATIONS

Fang, Lu, et al. "A new adaptive subpixel-based downsampling scheme using edge detection." 2009 IEEE International Symposium on Circuits and Systems. IEEE, 2009.*

Wen, Xing, et al. "Sub-pixel downsampling of video with matching highly data re-use hardware architecture." 2011 IEEE International Symposium of Circuits and Systems (ISCAS). IEEE, 2011.*

Lin, Weisi, and Li Dong. "Adaptive downsampling to improve image compression at low bit rates." IEEE Transactions on Image Processing 15.9 (2006): 2513-2521.*

Fang, Lu, et al. "Antialiasing filter design for subpixel downsampling via frequency-domain analysis." IEEE Transactions on Image Processing 21.3 (2012): 1391-1405.*

* cited by examiner

PIXEL-BASED METHOD AND APPARATUS OF OBTAINING DOWNSAMPLED IMAGE

TECHNICAL FIELD

The present invention relates to the field of image processing technology, and particularly to a pixel-based method and a pixel-based apparatus of obtaining a downsampled image.

DESCRIPTION OF RELATED ART

Conventional portable multimedia players (PMPs) and personal digital assistants (PDAs) generally display images with low-resolution. When a content inputted into these apparatuses is high-resolution, it is necessary to perform a downsampling (DS) processing on the high-resolution content. For example, the content with the resolution of 1280*960 is down to a resolution of 640*480 by the downsampling processing.

Currently, the downsampling methods can be classified into pixel-based downsampling and subpixel-based downsampling. The pixel-based DS method, for example an average pixel-based DS (APD) method, which obtains RGB values of four pixels and then calculate averages to obtain a new RGB value, although such APD method is simple in calculation, it would result in the problem of image blurring. The subpixel-based DS method, for example a diagonal direct subpixel-based DS method, which obtains values of RGB subpixels in diagonal directions to obtain a new image However, the pixel-based DS method easily causes the problem of image blurring, and the subpixel-based DS method easily causes the issue of color aliasing.

SUMMARY

Accordingly, a technical problem primarily to be solved by the present invention is to provide a pixel-based method and a pixel-based apparatus of obtaining a downsampled image, so as to obtain sharp image and avoid color aliasing.

In order to solve the above technical problem, a technical solution proposed by the present invention is to provide a pixel-based method of obtaining a downsampled image. A resolution of an original image is 2M*2N, and a resolution of the downsampled image is M*N. The method includes steps of: constructing a virtual image by an image super-resolution technology according to the resolution M*N of the downsampled image, wherein a resolution of the virtual image is 2M*2N; determining relational expressions between pixels of the virtual image and pixels of the downsampled image; calculating a mean squared error (MSE) between the pixels of the virtual image and pixels of the original image based on the relational expressions between the pixels of the virtual image and the pixels of the downsampled image; determining a coefficient matrix between the pixels of the downsampled image and the pixels of the original pixels under the condition of the mean squared error between the pixels of the virtual image and the pixels of the original image being at a minimum value; determining the pixels of the downsampled image according to the pixels of the original image and the coefficient matrix between the pixels of the downsampled image and the pixels of the original image; outputting the downsampled image as per the pixels of the downsampled image;

the step of constructing a virtual image by an image super-resolution technology according to the resolution M*N of the downsampled image includes: constructing the virtual image by an image super-resolution interpolation method according to the resolution M*N of the downsampled image;

the step of constructing the virtual image by an image super-resolution interpolation method according to the resolution M*N of the downsampled image includes: setting P1, P2, P3, P4 as pixels of the downsampled image and A, B, C as pixels of the virtual image constructed by the image super-resolution interpolation method, wherein positional relationships among P1, P2, P3, P4, A, B, C are that: A is located at an intersection of a diagonal line connecting P1 and P4 and another diagonal line connecting P2 and P3, B is located at a midpoint of a line connecting P1 and P2, and C is located at a midpoint of a line connecting P1 and P3; determining interpolation relational expressions between R, G, B subpixel values of the pixels A, B, C of the virtual image and R, G, B subpixel values of the pixels P1, P2, P3, P4 of the downsampled image as that: $A=\frac{1}{4}(P1+P2+P3+P4)$, $B=\frac{1}{2}(P1+P2)$, $C=\frac{1}{2}(P1+P3)$; determining interpolation relations between R, G, B subpixel values of the pixels of the virtual image and R, G, B subpixel values of the pixels of the downsampled image; calculating all the pixels of the downsampled image to construct the virtual image as per the interpolation relations between R, G, B subpixel values of the pixels of the virtual image and R, G, B subpixel values of the pixels of the downsampled image.

In an exemplary embodiment, the step of determining the pixels of the downsampled image according to the pixels of the original image and the coefficient matrix between the pixels of the downsampled image and the pixels of the original image includes: sorting the magnitudes of coefficients between each of the pixels of the downsampled image and all the pixels of the original image according to the coefficient matrix between the pixels of the downsampled image and the pixels of the original image; determining actually used coefficients for each of the pixels of the downsampled image and pixels of the original image corresponding to the actually used coefficients according to a sum of relatively large coefficients after sorting fell in the range of no less than 0.95 and no more than 1.05; determining the pixels of the downsampled image according to the actually used coefficients for each of the pixels of the downsampled image and the pixels of the original image corresponding to the actually used coefficients.

In order to solve the above technical problem, another technical solution proposed by the present invention is to provide a pixel-based method of obtaining a downsampled image. A resolution of an original image is 2M*2N, and a resolution of the downsampled image is M*N. The method includes steps of: constructing a virtual image by an image super-resolution technology according to the resolution M*N of the downsampled image, wherein a resolution of the virtual image is 2M*2N; determining relational expressions between pixels of the virtual image and pixels of the downsampled image; calculating a mean squared error between the pixels of the virtual image and pixels of the original image based on the relational expressions between the pixels of the virtual image and the pixels of the downsampled image; determining a coefficient matrix between the pixels of the downsampled image and the pixels of the original pixels under the condition of the mean squared error between the pixels of the virtual image and the pixels of the original image being at a minimum value; determining the pixels of the downsampled image according to the pixels of the original image and the coefficient matrix between the pixels of the downsampled image and the pixels of the original image; outputting the downsampled image as per the pixels of the downsampled image In an exemplary embodiment, the step of constructing a virtual image by an image super-resolution technology according to the resolution M*N of the downsampled image includes: constructing the virtual image by an image super-resolution interpolation method according to the resolution M*N of the downsampled image.

In an exemplary embodiment, the step of constructing the virtual image by an image super-resolution interpolation method according to the resolution M*N of the downsampled image includes: setting P1, P2, P3, P4 as pixels of the downsampled image and A, B, C as pixels of the virtual image constructed by the image super-resolution interpolation method, wherein positional relationships among P1, P2, P3, P4, A, B, C are that: A is located at an intersection of a diagonal line connecting P1 and P4 and another diagonal line connecting P2 and P3, B is located at a midpoint of a line connecting P1 and P2, and C is located at a midpoint of a line connecting P1 and P3; determining interpolation relational expressions between R, G, B subpixel values of the pixels A, B, C of the virtual image and R, G, B subpixel values of the pixels P1, P2, P3, P4 of the downsampled image as that: A=¼(P1+P2+P3+P4), B=½(P1+P2), C=½(P1+P3); determining interpolation relations between R, G, B subpixel values of the pixels of the virtual image and R, G, B subpixel values of the pixels of the downsampled image; calculating all the pixels of the downsampled image to construct the virtual image as per the interpolation relations between R, G, B subpixel values of the pixels of the virtual image and R, G, B subpixel values of the pixels of the downsampled image.

In an exemplary embodiment, the step of determining the pixels of the downsampled image according to the pixels of the original image and the coefficient matrix between the pixels of the downsampled image and the pixels of the original image includes: sorting the magnitudes of coefficients between each of the pixels of the downsampled image and all the pixels of the original image according to the coefficient matrix between the pixels of the downsampled image and the pixels of the original image; determining actually used coefficients for each of the pixels of the downsampled image and pixels of the original image corresponding to the actually used coefficients according to a sum of relatively large coefficients after sorting fell in the range of no less than 0.95 and no more than 1.05; determining the pixels of the downsampled image according to the actually used coefficients for each of the pixels of the downsampled image and the pixels of the original image corresponding to the actually used coefficients.

In order to solve the above technical problem, still another technical solution proposed by the present invention is to provide a pixel-based apparatus of obtaining a downsampled image. A resolution of an original image is 2M*2N, and a resolution of the downsampled image is M*N. The apparatus includes: a virtual image constructing module, configured to construct a virtual image by an image super-resolution technology according to the resolution M*N of the downsampled image, wherein a resolution of the virtual image is 2M*2N; a relational expression determining module, configured to determine relational expressions between pixels of the virtual image and pixels of the downsampled image; a mean squared error (MSE) calculating module, configured to calculate a mean squared error between the pixels of the virtual image and pixels of the original image based on the relational expressions between the pixels of the virtual image and the pixels of the downsampled image; a coefficient matrix determining module, configured to determine a coefficient matrix between the pixels of the downsampled image and the pixels of the original image under the condition of the mean squared error between the pixels of the virtual image and the pixels of the original image being at a minimum value; a pixel determining module, configured to determine the pixels of the downsampled image according to the pixels of the original image and the coefficient matrix between the pixels of the downsampled image and the pixels of the original image; an image output module, configured to output the downsampled image as per the pixels of the downsampled image.

In an exemplary embodiment, the virtual image constructing module specifically is configured to construct the virtual image by an image super-resolution interpolation method according to the resolution M*N of the downsampled image.

In an exemplary embodiment, the virtual image constructing module includes: a setting unit, configured to set P1, P2, P3, P4 as pixels of the downsampled image and A, B, C as pixels of the virtual image constructed by the image super-resolution interpolation method, wherein positional relationships among P1, P2, P3, P4, A, B, C are that A is located at an intersection of a diagonal line connecting P1 and P4 and another diagonal line connecting P2 and P3, B is located at a midpoint of a line connecting P1 and P2, and C is located at a midpoint of a line connecting P1 and P3; an interpolation relational expression determining unit, configured to determine interpolation relational expressions between R, G, B subpixel values of the pixels A, B, C of the virtual image and R, G, B subpixel values of the pixels P1, P2, P3, P4 of the downsampled image as that A=¼(P1+P2+P3+P4), B=½(P1+P2), C=½(P1+P3); an interpolation relations determining unit, configured to determine interpolation relations between R, G, B subpixel values of the pixels of the virtual image and R, G, B subpixel values of the pixels of the downsampled image; a virtual image constructing unit, configured to perform calculation on all the pixels of the downsampled image to construct the virtual image as per the interpolation relations between R, G, B subpixel values of the pixels of the virtual image and R, G, B subpixel values of the pixels of the downsampled image.

In an exemplary embodiment, the pixel determining module includes: a sorting unit, configured to sort the magnitudes of coefficients between each of the pixels of the downsampled image and all the pixels of the original image according to the coefficient matrix between the pixels of the downsampled image and the pixels of the original image; an actually used coefficient determining unit, configured to determine actually used coefficients for each of the pixels of the downsampled image and pixels of the original image corresponding to the actually used coefficients according to a sum of relatively large coefficients after sorting fell in the range of no less than 0.95 and no more than 1.05; a pixel determining unit, configured to determine the pixels of the downsampled image according to the actually used coefficients for each of the pixels of the downsampled image and the pixels of the original image corresponding to the actually used coefficients.

Beneficial effects can be achieved by the present invention that: compared with the prior art, the present invention constructs a virtual image with a resolution same as that of the original image by an image super-resolution technology according to the resolution M*N of the downsampled image, determines relational expressions between pixels of the virtual image and pixels of the downsampled image, calculates a MSE between the pixels of the virtual image and pixels of the original images based on the relational expressions between the pixels of the virtual image and the pixels of the downsampled image, determines a coefficient matrix between the pixels of the downsampled image and the pixels of the original image under the condition of the MSE between the pixels of the virtual image and the pixels of the original image being at a minimum value, determines the pixels of the downsampled image according to the pixels of the original image and the coefficient matrix between the pixels of the downsampled image and the pixels of the original image, and finally outputs the downsampled image as per the pixels of the downsampled image. Since the image super-resolution technology performs calculation on each pixel to construct the virtual image, analyzes the minimum MSE of the virtual imaged and the original image, and thereby the relations between the pixels of the downsampled image and the pixels of the original image can be inferred. Such pixel-based DS method not only can obtain sharp image, but also can avoid color aliasing.

In order to further understand the features and technical contents of the present invention, please refer to the following detailed description and accompanying drawings of the present invention. However, the drawings are provided for the purpose of illustration and description only, and are not intended to limit the present invention.

BRIEF DESCRIPTION OF THE DRAWINGS

Embodiments of the present invention will be described below in detail with reference to the drawings, and thereby the technical solutions of the present invention and other beneficial effects will be more apparent. In the drawings:

Figures 8, 9:
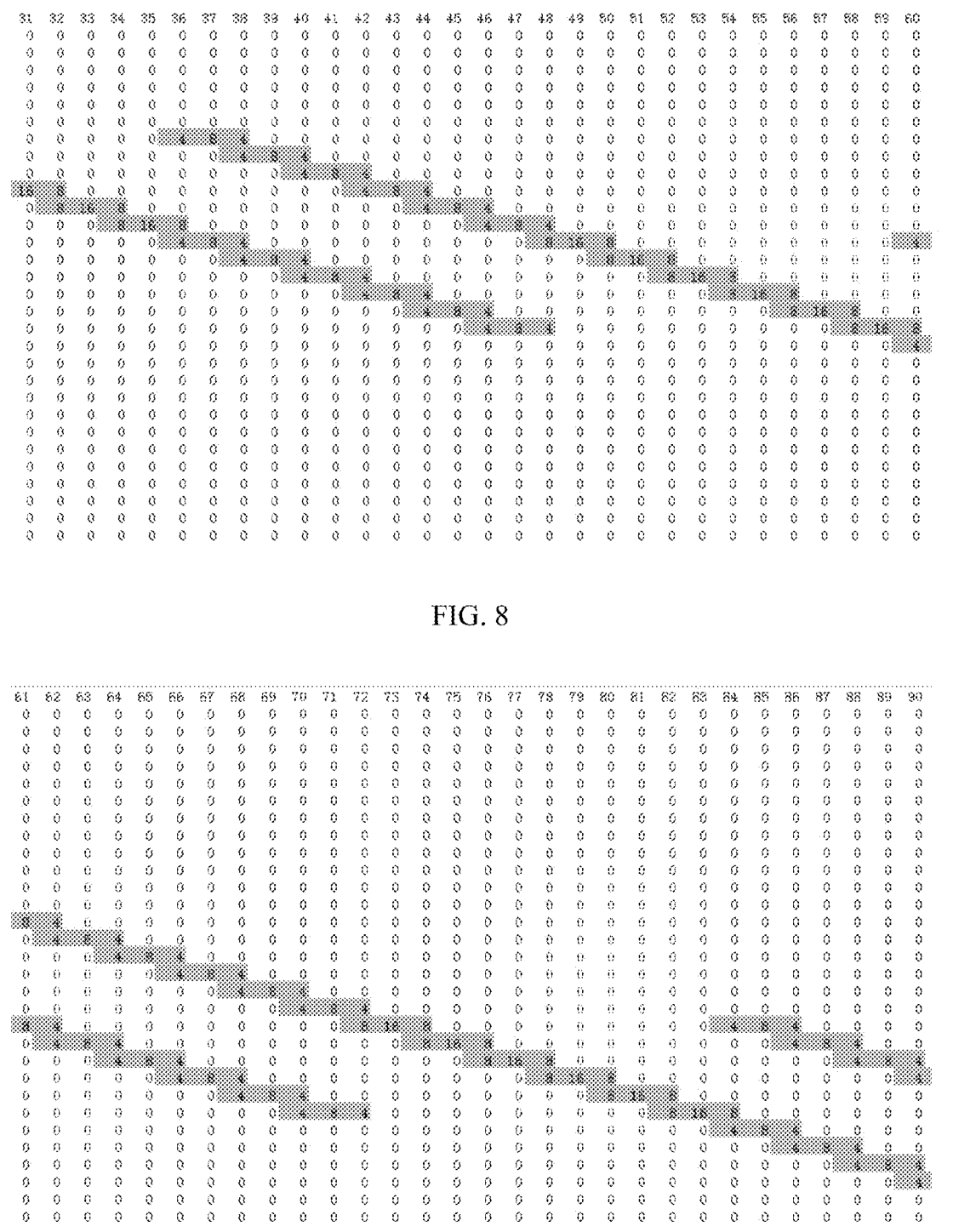

FIG. 8 is a schematic view of columns 31 to 60 of the matrix B in the pixel-based method of obtaining a downsampled image according to the present invention;

FIG. 9 is a schematic view of columns 61 to 90 of the matrix B in the pixel-based method of obtaining a downsampled image according to the present invention;

DETAILED DESCRIPTION OF EMBODIMENTS

In the following, with reference to accompanying drawings of embodiments of the present invention, technical solutions in the embodiments of the present invention will be clearly and completely described. Apparently, the embodiments of the present invention described below only are a part of embodiments of the present invention, but not all embodiments. Based on the described embodiments of the present invention, all other embodiments obtained by ordinary skill in the art without creative effort belong to the scope of protection of the present invention.

Figure 1:
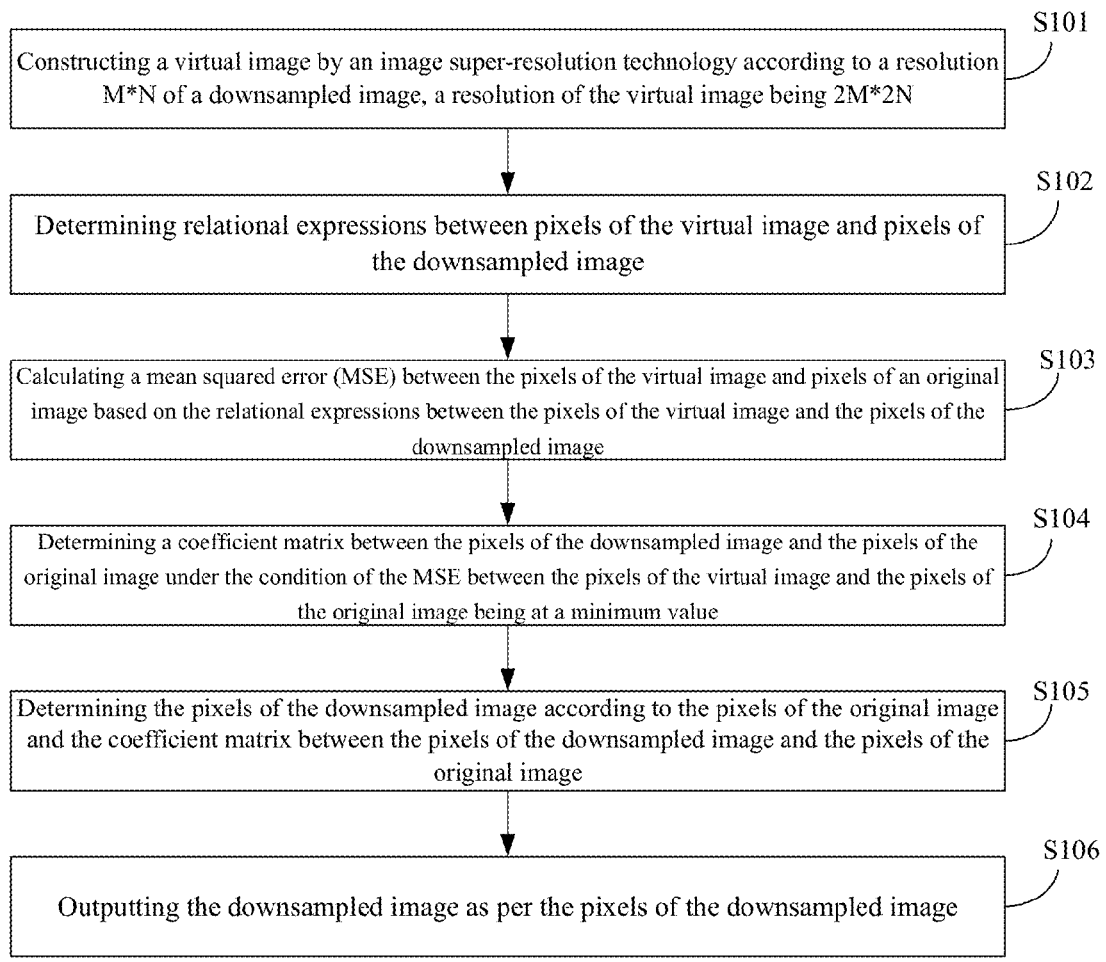
FIG. 1 is a flowchart of a pixel-based method of obtaining a downsampled image according to an exemplary embodiment of the present invention.

Referring to FIG. 1, FIG. 1 is a flowchart of a pixel-based method of obtaining a downsampled image according to an exemplary embodiment of the present invention. A resolution of an original image is 2M*2N, and a resolution of the downsampled image is M*N. The method includes the following steps S101, S102, S103, S104, S105 and S106.

Step S101: constructing a virtual image by an image super-resolution technology according to the resolution of M*N of the downsampled image, wherein a resolution of the virtual image is 2M*2N.

The resolution is used to describe the capability of discerning the image details, for example, an image projected by a projector is composed of many small projection points, and the resolution represents the number/amount of the points, such as 800*600 represents the image being composed of 800*600 points, each line having 800 projection points and being 600 lines in total. The higher the resolution is, and the sharper the projected image is.

The image super-resolution means that restoring a high-resolution image from a low-resolution image or image sequence. The image super-resolution technology is classified into super-resolution restoration and super-resolution reconstruction. Currently, the image super-resolution technology can be divided into three primary categories: interpolation-based, reconstruction-based and learning-based methods. The image super-resolution technology can be regards as a visual reverse process of restoring an or a series of high-resolution images from a sequence of low-resolution noise image and meanwhile can eliminate noise and blurring caused by optical elements.

As to the original image with the resolution of 2M*2N, when the original image is scaled down to ½ of its original size by a downsampling method, the generated image is referred to as downsampled image, and a resolution is changed to be M*N. According to the resolution M*N of the downsampled image, the virtual image is constructed by the image super-resolution technology, and the resolution of the virtual image is the same as the resolution of the original image.

By using the image super-resolution technology to construct the virtual image, the noise and blurring caused by optical elements can be eliminated.

Step S102: determining relational expressions between pixels of the virtual image and pixels of the downsampled image.

Since the virtual image is constructed by the image super-resolution technology according to the resolution of the downsampled image, the relational expressions between the pixels of the virtual image and the pixels of the downsampled image hereby can be determined.

Step S103: calculating a mean squared error (MSE) between the pixels of the virtual image and pixels of the original image based on the relational expressions between the pixels of the virtual image and the pixels of the downsampled image.

The mean squared error (MSE) is a convenient way for measuring the average error, and thus can evaluate the degree of data change. In mathematical statistics, MSE is an expected value of the difference square of estimated values of parameter and true values of parameter, the smaller the value of MSE is, the prediction model for describing experimental data has a better accuracy.

By calculating the MSE between the pixels of the virtual image and the pixels of the original image based on the relational expressions between the pixels of the virtual image and the pixels of the downsampled image, relational expressions between the pixels of the original image and the pixels of the downsampled image based on the MSE between the pixels of the virtual image and the pixels of the original image can be obtained.

Step S104: determining a coefficient matrix between the pixels of the downsampled image and the pixels of the original image under the condition of the MSE between the pixel of the virtual image and the pixels of the original image being at a minimum value.

The minimum value of the MSE between the pixels of the virtual image and the pixels of the original image is calculated. When the MSE between the pixels of the virtual image and the pixels of the original image is at the minimum value, a difference between the virtual image and the original image is minimum, and thus the coefficient matrix between the pixels of the downsampled image and the pixels of the original image hereby can be determined.

Step S105: determining the pixels of the downsampled image according to the pixels of the original image and the coefficient matrix between the pixels of the downsampled image and the pixels of the original image.

In the situation of the pixels of the original image and the coefficient matrix between the pixels of the downsampled image and the pixels of the original image all are known, the pixels of the downsampled image can be obtained.

Step S106: outputting the downsampled image as per the pixels of the downsampled image.

The embodiment of the present invention constructs the virtual image with a resolution same as that of the original image by image super-resolution technology according to the resolution M*N of the downsampled image, determines the relational expressions between the pixels of the virtual image and the pixels of the downsampled image, calculates the MSE between the pixels of the virtual image and the pixels of the original image based on the relational expressions between the pixels of the virtual image and the pixels of the downsampled image, determines the coefficient matrix between the pixels of the downsampled image and the pixels of the original image under the condition of the MSE between the pixels of the virtual image and the pixels of the original image being at the minimum value, determines the pixels of the downsampled image according to the pixels of the original image and the coefficient matrix between the pixels of the downsampled image and the pixels of the original image, and outputs the downsampled image as per the pixels of the downsampled image. Since the image super-resolution technology computes each pixel to construct the virtual image, analyzes the minimum MSE of the virtual image and the original image, and then deduces the relation between the pixels of the downsampled image and the pixels of the original image. Accordingly, such pixel-based DS method not only can obtain sharp image, but also can avoid color aliasing.

In the step S101, it may be that the virtual image is constructed by an image super-resolution interpolation method according to the resolution M*N of the downsampled image.

As described above, the image super-resolution technology can be divided into three primary categories: interpolation-based, reconstruction-based and learning-based methods. In this embodiment, the interpolation method is adopted, and the interpolation method is but not limited to nearest neighbor interpolation, linear interpolation, bi-cubic interpolation, spline interpolation, kernel regression interpolation, and so on.

By using the interpolation method, it can very simple and convenient to construct the virtual image according to the resolution M*N of the downsampled image.

Figure 2:
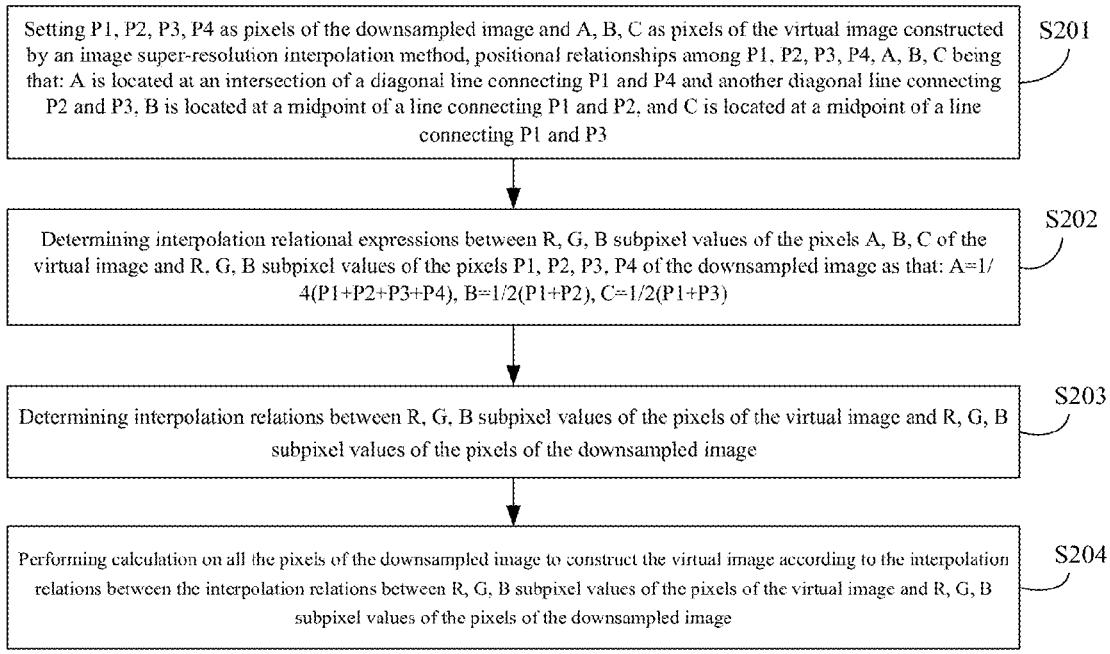
FIG. 2 is a flowchart of a pixel-based method of obtaining a downsampled image according to another exemplary embodiment of the present invention.

Referring to FIG. 2, the step of constructing a virtual image by an image super-resolution interpolation method according to the resolution M*N of the downsampled image may specifically include steps S201, S202, S203 and S204.

Step S201: setting P1, P2, P3, P4 as pixels of the downsampled image and A, B, C as pixels of the virtual image constructed by the image super-resolution interpolation method; wherein positional relationships among P1, P2, P3, P4, A, B, C are that: A is located at the intersection of a diagonal line connecting P1 and P4 and another diagonal line connecting P2 and P3, B is located at the midpoint of a line connecting P1 and P2, and C is located at the midpoint of a line connecting P1 and P3.

Figure 3:
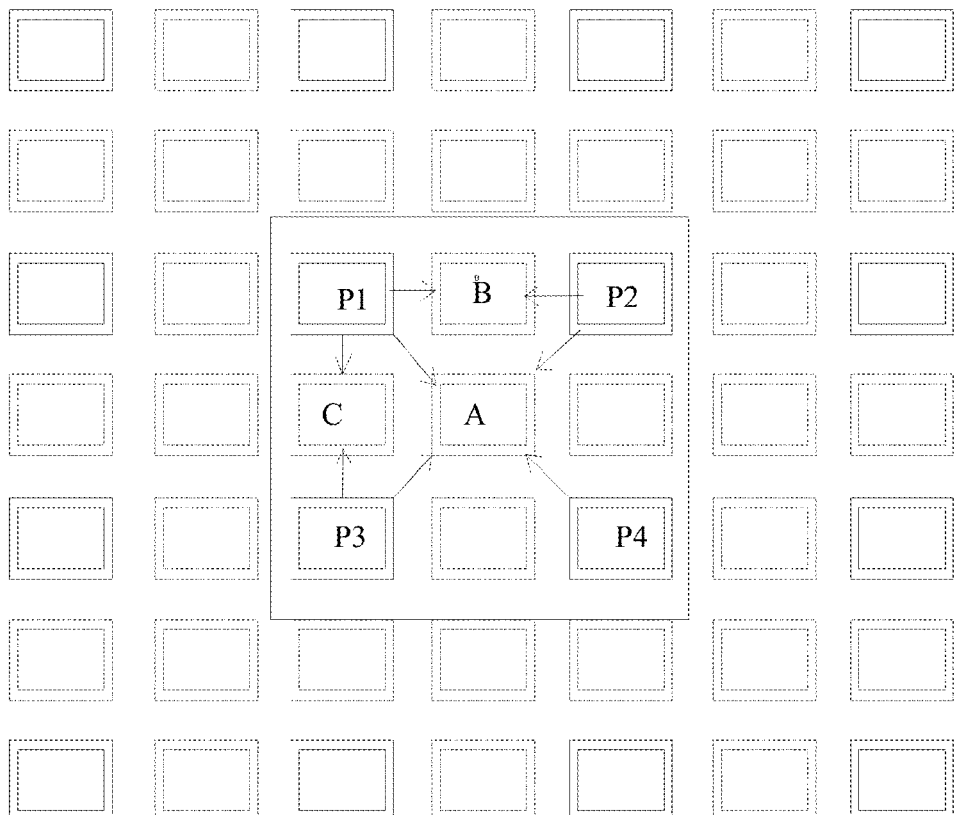
FIG. 3 is a schematic view of a positional relationship between pixels P1, P2, P3, P4 of a downsampled image and pixels A, B, C of a virtual image in a pixel-based method of obtaining a downsampled image according to the present invention.

Referring to FIG. 3, solid line boxes represent pixels of the downsampled image, and dashed line boxes represent pixels of the virtual image. The positional relationships among P1, P2, P3, P4, A, B, C are that: A is located at the intersection of the diagonal line connecting P1 and P4 and the diagonal line connecting P2 and P3, B is located at the midpoint of the line connecting P1 and P2, and C is located at the midpoint of the line connecting P1 and P3.

Step S202: determining interpolation relational expressions between R, G, B subpixel values of the pixels A, B, C of the virtual image and R, G, B subpixel values of the pixels P1, P2, P3, P4 of the downsampled image as that: $A=\frac{1}{4}(P1+P2+P3+P4)$, $B=\frac{1}{2}(P1+P2)$, $C=\frac{1}{2}(P1+P3)$.

Referring to FIG. 3, when performing interpolation on the pixels of the downsampled image to obtain the pixels of the virtual image, the interpolation is performed as per the interpolation relational expressions: $A=\frac{1}{4}(P1+P2+P3+P4)$, $B=\frac{1}{2}(P1+P2)$, $C=\frac{1}{2}(P1+P3)$. The R, G, B subpixel values of the pixels A, B, C of the virtual image and the R, G, B subpixel values of the pixels P1, P2, P3, P4 of the downsampled image are performed with interpolation as per the above interpolation relational expressions, i.e., R, G, B are individually computed. Specifically, they are that:

A(R)=¼{P1(R)+P2(R)+P3(R)+P4(R)}, B(R)=½{P1 (R)+P2(R)}, C(R)=½{P1(R)+P3(R)}, where A(R), B(R), C(R), P1(R), P2(R), P3(R), P4(R) respectively represent red (R) subpixel values of the pixels A, B, C, P1, P2, P3, P4;

A(G)=¼{P1(G)+P2(G)+P3(G)+P4(G)}, B(G)=½{P1 (G)+P2(G)}, C(G)=½{P1(G)+P3(G)}, where A(G), B(G), C(G), P1(G), P2(G), P3(G), P4(G) respectively represent green (G) subpixel values of the pixels A, B, C, P1, P2, P3, P4;

A(B)=¼{P1(B)+P2(B)+P3(B)+P4(B)}, B(B)=½{P1 (B)+P2(B)}, C(B)=½{P1(B)+P3(B)}, where A(B), B(B), C(B), P1(B), P2(B), P3(B), P4(B) respectively represent blue (B) subpixel values of the pixels A, B, C, P1, P2, P3, P4.

Step S203: determining interpolation relations between R, G, B subpixel values of the pixels of the virtual image and R, G, B subpixel values of the pixels of the downsampled image.

As per the above interpolation method, the interpolation relations between R, G, B subpixel values of the pixels of the virtual image and R, G, B subpixel values f the pixels of the downsampled image can be determined.

Step S204: calculating all the pixels of the downsampled image to construct the virtual image according to the interpolation relations between R, G, B subpixel values of the pixels of the virtual image and R, G, B subpixel values of the pixels of the downsampled image.

By using the embodiment of the present invention, the virtual image can be obtained by simple interpolation, and thus the computing/calculating process is further simplified.

In the following, a specific example is taken to describe a pixel-based method of obtaining a downsampled image according to the present invention.

Figures 4, 5:
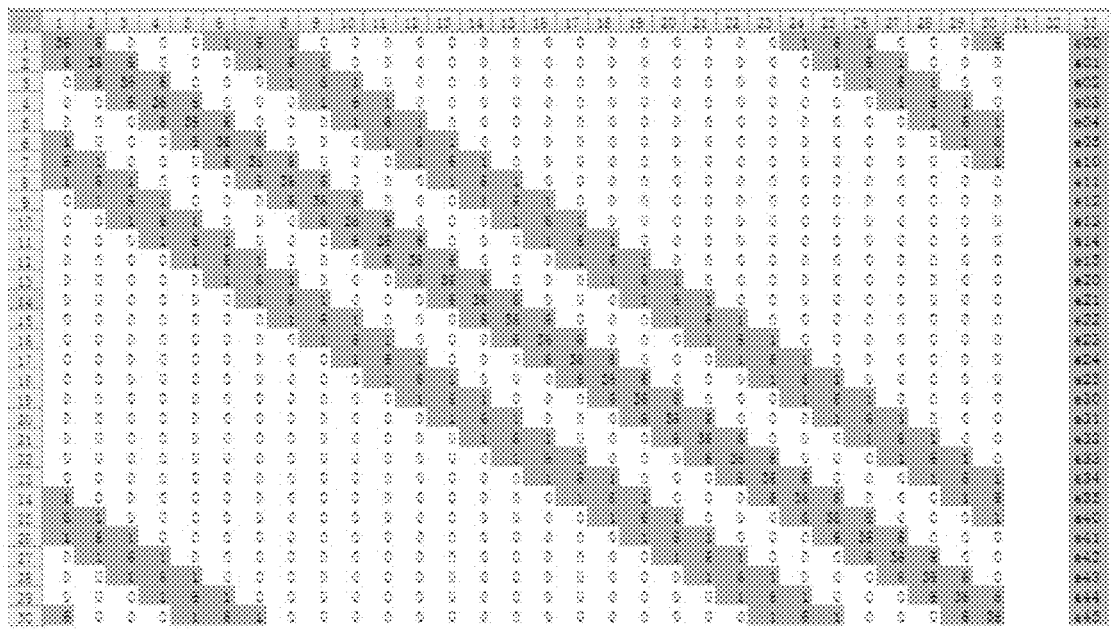
FIG. 4 is a schematic view of positions of pixels of a downsampled image and pixels of a virtual image after interpolation in a pixel-based method of obtaining a downsampled image according to the present invention.
FIG. 5 is a schematic view of a matrix A and a matrix e in a pixel-based method of obtaining a downsampled image according to the present invention.

As shown in FIG. 4, interpolations are carried out as per the interpolation relational expressions: A=¼(P1+P2+P3+P4), B=½(P1+P2), C=½(P1+P3). Pixels of the virtual image being obtained after interpolation are d00~d911, i.e., 120 pixels in total, and pixels of the downsampled are e00~45, i.e., 30 pixels in total.

It is assumed that e00~e45 are known points, a 2*2 times magnification is carried out by interpolation as per the above interpolation relational expressions of A=¼(P1+P2+P3+P4), B=½(P1+P2), C=½(P1+P3). If the pixel e22 of the downsampled image is taken as an example, relations between the pixels d33, d35, d53, d55, d34, d43, d45, d54, d44 of the virtual image and e22 satisfy the following expressions (1)~(9):

$$d33 = \frac{1}{4}(e11 + e12 + e21 + e22) \quad (1)$$

$$d35 = \frac{1}{4}(e12 + e13 + e22 + e23) \quad (2)$$

$$d53 = \frac{1}{4}(e21 + e22 + e31 + e32) \quad (3)$$

$$d55 = \frac{1}{4}(e22 + e23 + e32 + e33) \quad (4)$$

$$d34 = \frac{1}{4}(e12 + e22) \quad (5)$$

$$d43 = \frac{1}{4}(e21 + e22) \quad (6)$$

$$d45 = \frac{1}{4}(e22 + e23) \quad (7)$$

$$d54 = \frac{1}{2}(e22 + e32) \quad (8)$$

$$d44 = e22 \quad (9)$$

Pixels of the original image are f00~f911, i.e., 120 pixels in total. A MSE between pixels of the virtual image and pixels of the original image is calculated as that:

$$MSE = \frac{1}{M*N}\{(d_{0,0} - f_{0,0})^2 + (d_{0,1} - f_{0,1})^2 + \ldots + (d_{N-1,N-1} - f_{N-1,N-1})^2 + (d_{N,N} - f_{N,N})^2\} = \frac{1}{10*12}\{(d00 - f00)^2 + (d01 - f01)^2 + \ldots + (d910 - f910)^2 + (d911 - f911)^2\} \quad (10)$$

After the expressions (1)~(9) are substituted into the expression (10), an expression (11) is obtained as follows:

$$MSE = \frac{1}{10*12}\left\{\left(\frac{1}{4}(e11 + e12 + e21 + e22) - f33\right)^2 + \left(\frac{1}{4}(e12 + e13 + e22 + e23) - f35\right)^2 + \left(\frac{1}{4}(e21 + e22 + e31 + e32) - f53\right)^2 + \left(\frac{1}{4}(e22 + e23 + e32 + e33) - f55\right)^2 + \left(\frac{1}{2}(e12 + e22) - f34\right)^2 + \left(\frac{1}{2}(e21 + e22) - f43\right)^2 + \left(\frac{1}{2}(e22 + e23) - f45\right)^2 + \left(\frac{1}{2}(e22 + e32) - f54\right)^2 + (e22 - f44)^2 + \ldots\right\} \quad (11)$$

As known from the super-resolution interpolation method, in the expression (11), sub-expressions relevant to e22 are nine sub-expressions being not omitted, and a first order derivative of MSE with respect to e22 then can be obtained as the following expression (12):

$$MSE'(e22) = \frac{1}{10*12}\left\{\frac{1}{2}\left(\frac{1}{4}(e11 + e12 + e21 + e22) - f33\right) + \frac{1}{2}\left(\frac{1}{4}(e12 + e13 + e22 + e23) - f35\right) + \frac{1}{2}\left(\frac{1}{4}(e21 + e22 + e31 + e32) - f53\right) + \frac{1}{2}\left(\frac{1}{4}(e22 + e23 + e32 + e33) - f55\right) + \left(\frac{1}{2}(e12 + e22) - f34\right) + \left(\frac{1}{2}(e21 + e22) - f43\right) + \left(\frac{1}{2}(e22 + e23) - f45\right) + \left(\frac{1}{2}(e22 + e32) - f54\right) + 2(e22 - f44)\right\} \quad (12)$$

Afterwards, a minimum value of the MSE between the pixels of the virtual image and the pixels of the original image is calculated. When MSE'(e22)=0, the MSE(e22) is at the minimum value. At this time, the following expression (13) can be inferred from MSE'(e22)=0 that:

$$e11 + 6e12 + e13 + 6e21 + 36e22 + 6e23 + e31 + 6e32 + e33 = 4f33 + 8f34 + 4f35 + 8f43 + 16f44 + 8f45 + 4f53 + 8f54 + 4f55 \quad (13)$$

Figures 6, 7:
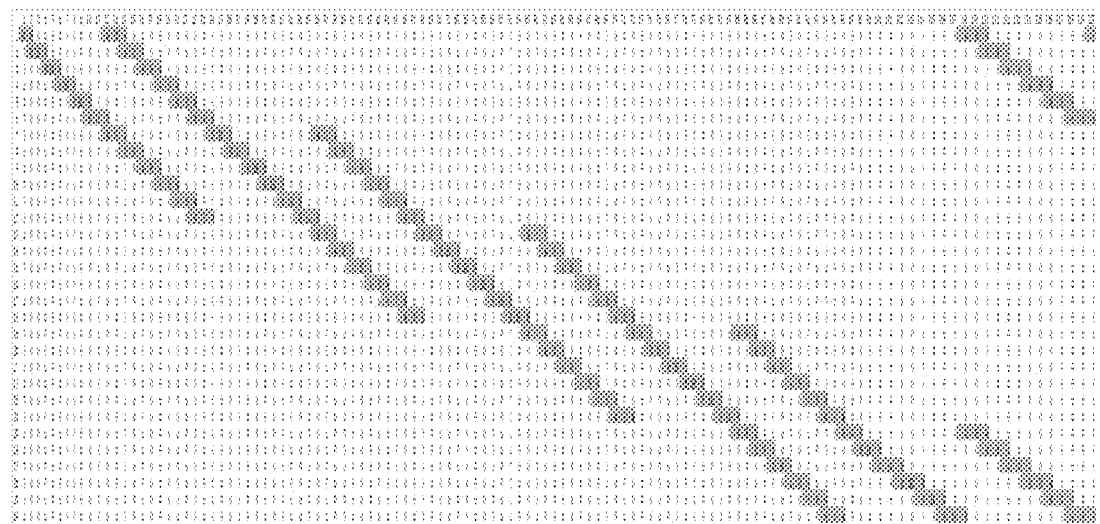
FIG. 6 is a schematic view of a whole matrix B in a pixel-based method of obtaining a downsampled image according to the present invention.
FIG. 7 is a schematic view of columns 1 to 30 of the matrix B in the pixel-based method of obtaining a downsampled image according to the present invention.
Figure 10:
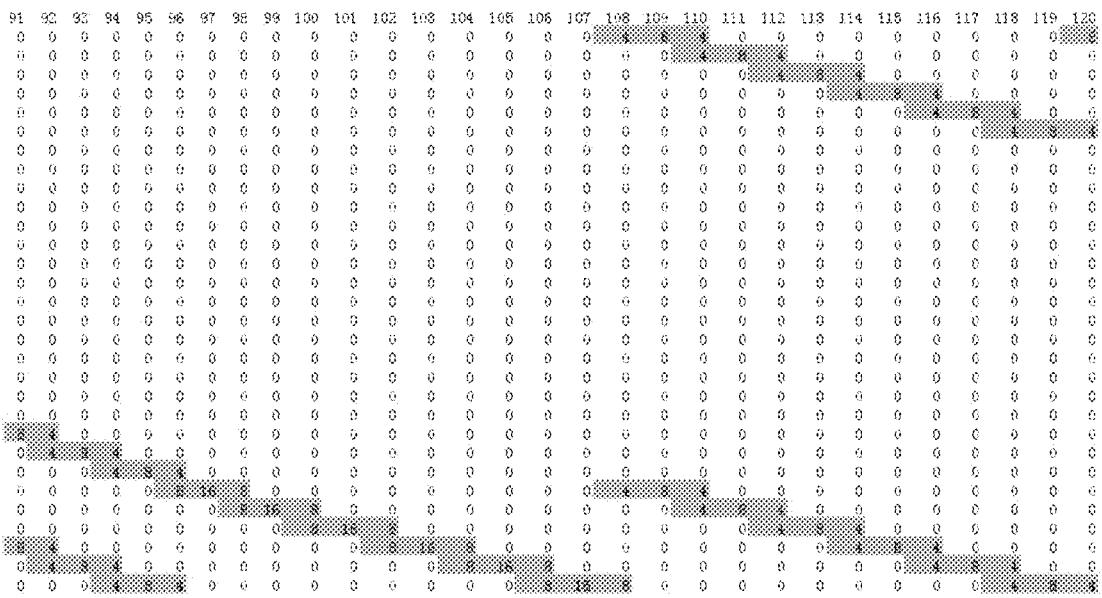
FIG. 10 is a schematic view of columns 91 to 120 of the matrix B in the pixel-based method of obtaining a downsampled image according to the present invention.
Figure 11:
FIG. 11 is a schematic view of a matrix f in a pixel-based method of obtaining a downsampled image according to the present invention.

Likewise, as per the above method, after performing the first order derivative of MSE with respect to each of the pixels e00~e45 of the downsampled image and then obtaining expressions inferred from MSE'(e22)=0, the following expression can be obtained:

$$A*e = B*f \quad (14)$$

where, e is a 30*1 matrix [e00; e01; e02; ... ; e53; e54; e55], f is 120*1 matrix [f00; f01; f02; ... ; f99; f910; f911], A is a 30*30 matrix, B is a 30*120 matrix. The matrix A and matrix e are illustrated in FIG. 5, the left side 30*30 matrix is the matrix A, and the right side 30*1 matrix is the matrix e. Since the matrix B is a 30*120 matrix which has excessive number of columns, for the convenience of discerning the data, the matrix B is divided into four matrices for illustration. FIG. 6 is the whole diagram of the matrix B. FIGS. 7 through 10 respectively are the four matrices divided from the matrix B, i.e., respectively are the matrix of data in $1^{st}$ to $30^{th}$ columns, the matrix of data in $31^{th}$ to $60^{th}$ columns, the matrix of data in $61^{th}$ to $90^{th}$ columns and the matrix of data in $91^{th}$ to $120^{th}$ columns. f is a 120*1 matrix as shown in FIG. 11.

$A^{-1}*A*e=A^{-1}*B*f$ can be inferred from $A*e=B*f$, and thus it can be obtained that $e=A^{-1}*B*f$. Accordingly, after the value of coefficient matrix $A^{-1}*B$ is calculated out, the relationship between the pixels of the downsampled image and the pixels of the original image can be inferred.

Figure 12:
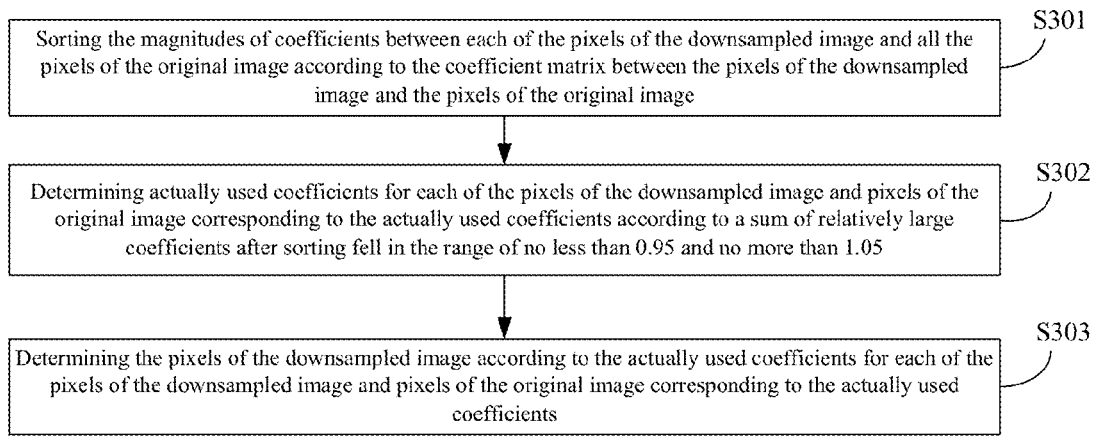
FIG. 12 is a flowchart of a pixel-based method of obtaining a downsampled image according to still another embodiment of the present invention.

Referring to FIG. 12, in the step S105, the step of determining the pixels of the downsampled image according to the pixels of the original image and the coefficient matrix between the pixels of the downsampled image and the pixels of the original image may specifically include the steps S301, S302 and S303.

Step S301: sorting the magnitudes of coefficients between each of the pixels of the downsampled image and all the pixels of the original image according to the coefficient matrix between the pixels of the downsampled image and the pixels of the original image.

Step S302: determining actually used coefficients for each of the pixels of the downsampled image and pixels of the original image corresponding to the actually used coefficients according to a sum of relatively large coefficients after sorting fell in the range of no less than 0.95 and no more than 1.05.

Step S303: determining the pixels of the downsampled image according to the actually used coefficients for each of the pixels of the downsampled image and the pixels of the original image corresponding to the actually used coefficients.

For example, as per the above described example, $e=A^{-1}*B*f$, the coefficient matrix between the pixels of the downsampled image and the pixels of the original image is $A^{-1}*B$. Firstly, the inverse matrix $A^{-1}$ of the matrix A is obtained, the inverse matrix $A^{-1}$ of the matrix A then is multiplied with the matrix B to obtain the product of $A^{-1}*B$. The product of $A^{-*}B$ is a 30*120 matrix, coefficients in each row is sorted according to the magnitudes of the coefficients, for example sorted in descending order, the coefficients in the front (i.e., relatively large coefficients) are added until the sum of added coefficients is not less than 0.95 and not more than 1.05, and thereby actually used coefficients are determined, the pixels of the original images corresponding to the actually used coefficients also are determined, and the pixels of the downsampled image are obtained consequently. If the pixel e22 of the downsampled image is taken as an example, the coefficients relevant to e22 is located in the $15^{th}$ row of the product matrix $A^{-1}*B$, the coefficients in the $15^{th}$ row are sorted in descending order, when the sum of coefficients in the front being added falls in the range of no less than 0.95 and no more than 1.05, the result is listed as the following table:

| Order number | Weight (Coefficient) | Corresponding pixel |
|---|---|---|
| 1 | 0.499847 | f44 |
| 2 | 0.232128 | f34 |
| 3 | 0.20726 | f54 |
| 4 | 0.20726 | f45 |
| 5 | 0.20705 | f43 |
| 6 | 0.110914 | f55 |
| 7 | 0.085852 | f33 |
| 8 | 0.085835 | f35 |
| 9 | −0.08575 | f53 |
| 10 | −0.08575 | f42 |
| 11 | −0.08533 | f46 |
| 12 | −0.08533 | f64 |
| 13 | 0.060756 | f24 |
| 14 | −0.06044 | f74 |
| 15 | −0.03954 | f14 |
| 16 | −0.03657 | f36 |
| 17 | −0.03657 | f52 |
| 18 | −0.03559 | f32 |
| 19 | −0.03559 | f56 |
| 20 | −0.3555 | f41 |
| 21 | −0.03555 | f47 |
| sum | 1.039341 | |

Figure 13:
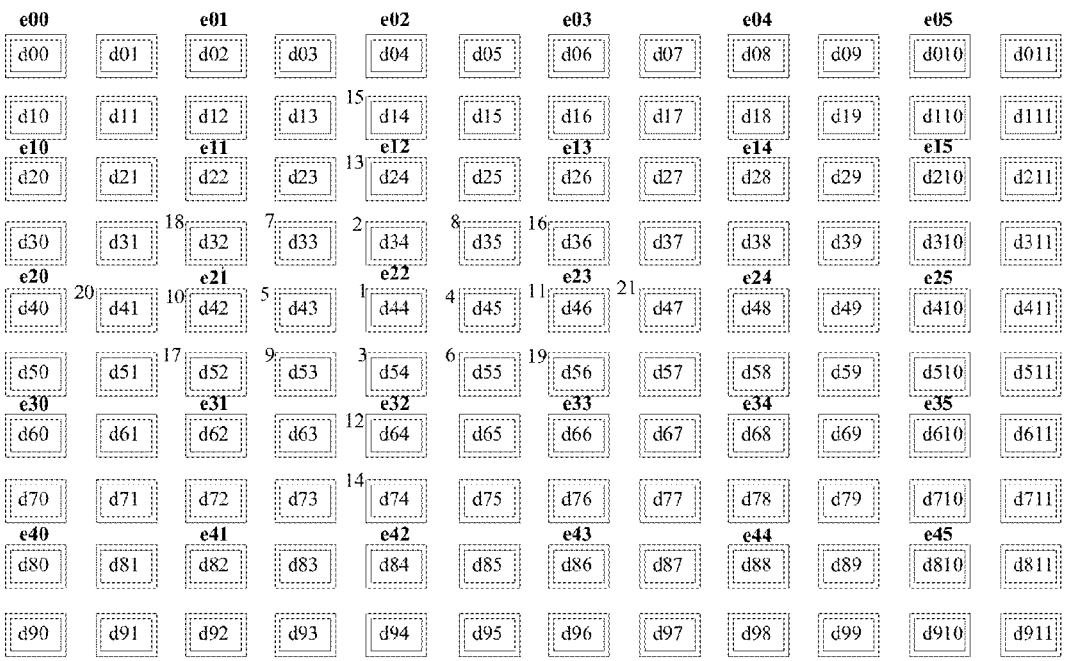
FIG. 13 is a schematic view of positions of pixels in an original image corresponding to twenty-one coefficients in a pixel-based method of obtaining a downsampled image according to the present invention.

Then, R subpixel value of e22 is that:

$$e22(R)=0.499847*f44(R)+0.232128*f34(R)+ \ldots + (-0.03555)*f47(R),$$

where the symbol "*" represents multiplying, (R) represent a R subpixel value of pixel. G, B subpixel values of e22 are obtained according to the same method. FIG. 13 is a schematic view of positions of pixels of the original image corresponding to the above twenty-one coefficients.

By using the above method, the amount of computation can be reduced and the storage space can be saved. In addition, it is found by experiments that, as to different resolution matrices of original image, the coefficient values would change but still are close, and the sorting orders of the magnitudes of coefficients are the same.

Figure 14:
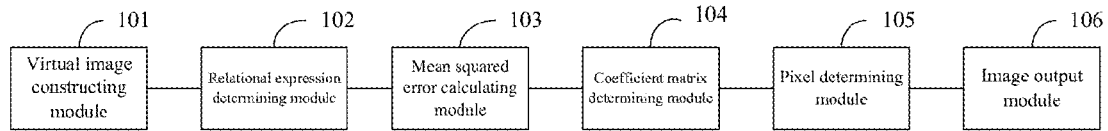
FIG. 14 is a schematic structural view of a pixel-based apparatus of obtaining a downsampled image according to an exemplary embodiment of the present invention.

Referring to FIG. 14, which is a schematic structural view of a pixel-based apparatus of obtaining a downsampled image according to an embodiment of the present invention. The apparatus is applied to the situation of an original image being with a resolution of 2M*2N and the downsampled image being with a resolution of M*N. In particular, the apparatus includes: a virtual image constructing module 101, a relational expression determining module 102, a MSE calculating module 103, a coefficient matrix determining module 104, a pixel determining module 105, and an image output module 106. It can be understood that the virtual image constructing module 101, the relational expression determining module 102, the MSE calculating module 103, the coefficient matrix determining module 104, the pixel determining module 105 and the image output module 106 all may be software modules stored in a memory and executable by one or more processors.

The virtual image constructing module 101 is configured (i.e., structured and arranged) to construct a virtual image with a resolution 2M*2N by an image super-resolution technology according to a resolution M*N of a downsampled image.

The resolution is used to describe the capability of discerning image details, for example, an image projected by a projector is composed of many small projection points, and the resolution represents the number/amount of these projection points, such as 800*600 represents the image being composed of 800*600 points, each line having 800 projection points arranged thereon, and having 600 lines in total. The higher the resolution is, the sharper the projected image is.

The image super-resolution means that restoring a high-resolution image from a low-resolution image or image sequence. The image super-resolution technology is classified into resolution restoration and resolution reconstruction. Currently, the image super-resolution technology may be divided into three primary categories: interpolation-based, reconstruction-based and learning-based method. The image super-resolution technology can be regarded as a visual reverse process of restoring a or a series of high-resolution original images from a sequence of low-resolution noise images, and further can eliminate the noise and blurring caused by optical elements.

As to the original image with the resolution of 2M*2N, when the original image is scaled down to ½ of its original size by a downsampling method, the generated image is referred to as downsampled image, and a resolution of the downsampled image is M*N. According to the resolution M*N of the downsampled image, the virtual image constructed by the image super-resolution technology will have a resolution same as that of the original image.

By using the image super-resolution technology to construct the virtual image, the noise and blurring caused by optical elements can be eliminated.

The relational expression determining module 102 is configured to determine relational expressions between pixels of the virtual image and pixels of the downsampled image.

Since the virtual image is constructed by the image super-resolution technology according to the resolution of the downsampled image, the relational expressions between the pixels of the virtual image and the pixels of the downsampled image hereby can be determined.

The mean squared error (MSE) calculating module 103 is configured to calculate a MSE between the pixels of the virtual image and pixels of the original image based on the relational expressions between the pixels of the virtual image and the pixels of the downsampled image.

The MSE (Mean Squared Error) is a very convenient way to measure "average error" and can evaluate the degree of data change. In mathematical statistics, the MSE is an expected value of difference square of estimated values of parameter and true values of parameter, the smaller the value of MSE is, the prediction model for describing experiment data would have better accuracy.

Based on the relational expressions between the pixels of the virtual image and the pixels of the downsampled image, the MSE between the pixels of the virtual image and the pixels of the original image can be calculated, and then relational expressions between the pixels of the original image and the pixels of the downsampled image based on the MSE between the pixels of the virtual image and the pixels of the original image can be obtained.

The coefficient matrix determining module 104 is configured to determine a coefficient matrix between the pixels of the downsampled image and the pixels of the original image under the condition of the MSE between the pixels of the virtual image and the pixels of the original image being at a minimum value.

Regarding the calculation of the minimum value of the MSE between the pixels of the virtual image and the pixels of the original image, when the MSE between the pixels of the virtual image and the pixels of the original image is at the minimum value, a difference between the virtual image and the original image is minimum, and the coefficient matrix between the pixels of the downsampled image and the pixels of the original image hereby can be determined.

The pixel determining module 105 is configured to determine the pixels of the downsampled image according to the pixels of the original image and the coefficient matrix between the pixels of the downsampled image and the pixels of the original image.

When the pixels of the original image and the coefficient matrix between the pixels of the downsampled image and the pixels of the original image all are known, the pixels of the downsampled image can be obtained.

The image output module 106 is configured to output the downsampled image as per the pixels of the downsampled image.

The embodiment of the present invention constructs a virtual image with a resolution same as that of the original image by an image super-resolution technology according to the resolution M*N of the downsampled image, determines relational expressions of pixels of the virtual image and pixels of the downsampled image, calculates a MSE between the pixels of the virtual image and pixels of the original images based on the relational expressions between the pixels of the virtual image and the pixels of the downsampled image, determines a coefficient matrix between the pixels of the downsampled image and the pixels of the original image under the condition of the MSE between the pixels of the virtual image and the pixels of the original image being at a minimum value, determines the pixels of the downsampled image according to the pixels of the original image and the coefficient matrix between the pixels of the downsampled image and the pixels of the original image, and finally outputs the downsampled image as per the pixels of the downsampled image. Since the image super-resolution technology performs computation on each pixel to construct the virtual image, and analyzes the minimum MSE of the virtual imaged and the original image, and thereby the relations between the pixels of the downsampled image and the pixels of the original image can be inferred. Such pixel-based DS method not only can obtain sharp image, but also can avoid color aliasing.

Moreover, the virtual image constructing module 101 specifically is configured to construct the virtual image by an image super-resolution interpolation method according to the resolution M*N of the downsampled image.

As described above, the image super-resolution technology may be divided into three primary categories: interpolated-based, reconstruction-based and learning-based methods. In the exemplary embodiment, the interpolation method is adopted, and the interpolation method is but not limited to nearest neighbor interpolation, linear interpolation, bi-cubic interpolation, spline interpolation, kernel regression interpolation, and so on.

By using the interpolation method, it is very simple and convenient to construct the virtual image according to the resolution M*N of the downsampled image.

Figure 15:
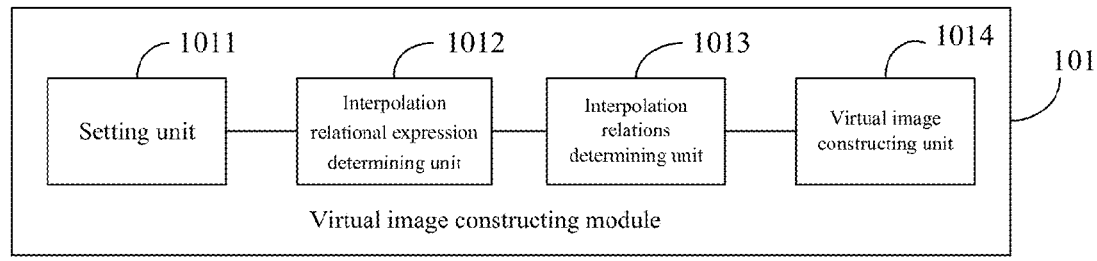
FIG. 15 is a schematic structural view of a pixel-based apparatus of obtaining a downsampled image according to another exemplary embodiment of the present invention.

Referring to FIG. 15, in an exemplary embodiment, the virtual image constructing module 101 includes a setting unit 1011, an interpolation relational expression determining unit 1012, an interpolation relations determining unit 1013 and a virtual image constructing unit 1014.

The setting unit 1011 is configured to set P1, P2, P3, P4 as pixels of the downsampled and A, B, C as pixels of the virtual image constructed by an image super-resolution interpolation method. Positional relationships among P1, P2, P3, P4, A, B, C are that: A is located at the intersection between a diagonal line connecting P1 and P4 and another diagonal line connecting P2 and P3, B is located at the midpoint of a line connecting P1 and P2, and C is located at the midpoint of a line connecting P1 and P3.

The interpolation relational expression determining unit 1012 is configured to determine interpolation relational expressions between R, G, B subpixel values of the pixels A, B, C of the virtual image and R, G, B subpixel values of the pixels P1, P2, P3, P4 of the downsampled image as that: A=¼(P1+P2+P3+P4), B=½(P1+P2), C=½(P1+P3).

When performing interpolation on the pixels of the downsampled image to obtain the pixels of the virtual image, the interpolation is carried out according to the interpolation relational expressions: A=¼(P1+P2+P3+P4), B=½(P1+P2), C=½(P1+P3). The R, G, B subpixel values of the pixels A, B, C of the virtual image and the R, G, B subpixel values of the pixels P1, P2, P3, P4 of the downsampled are performed with interpolation as per the above interpolation relational expressions, i.e., R, G, B are calculated individually.

The interpolation relations determining unit 1013 is configured to determine interpolation relations between R, G, B subpixel values of the pixels of the virtual image and R, G, B subpixel values of the pixels of the downsampled image.

As per the above interpolation method, the interpolation relations between the R, G, B subpixel values of the pixels of the virtual image and the R, G, B subpixel values of the pixels of the downsampled image can be determined.

The virtual image constructing unit 1014 is configured to calculate all pixels of the downsampled image to construct the virtual image as per the interpolation relations between the R, G, B subpixel values of the pixels of the virtual image and the R, G, B subpixel values of the pixels of the downsampled image.

By adopting the embodiment of the present invention, the virtual image can be obtained by simple interpolation, and the computation process can be further simplified.

Figure 16:
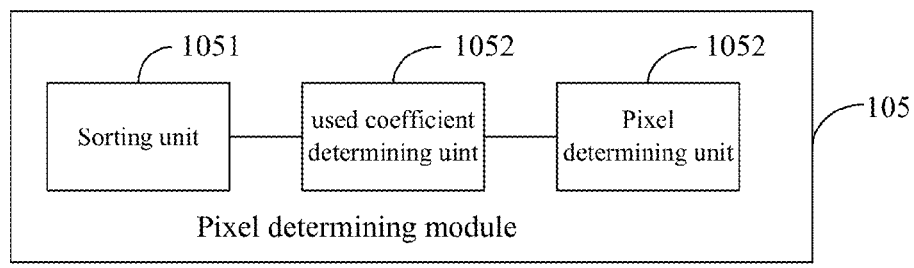
FIG. 16 is a schematic structural view of a pixel-based apparatus of obtaining a downsampled image according to still another exemplary embodiment of the present invention.

Referring to FIG. 16, in an exemplary embodiment, the pixel determining module 105 includes a sorting unit 1051, an actually used coefficient determining unit 1052 and a pixel determining unit 1053.

The sorting unit 1051 is configured to sort the magnitudes of coefficients between each of the pixels of the downsampled image and all the pixels of the original image according to the coefficient matrix between the pixels of the downsampled image and the pixels of the original image.

The actually used coefficient determining unit 1052 is configured to determine actually used coefficients for each of the pixels of the downsampled image and pixels of the original image corresponding to the actually used coefficients according to a sum of relatively large coefficients after sorting fell in the range of no less than 0.95 and no more than 1.05.

The pixel determining unit 1053 is configured to determine the pixels of the downsampled image according to the actually used coefficients for each of the pixels of the downsampled image and the pixels of the original image corresponding to the actually used coefficients.

By adopting the above method, the amount of computation can be reduced and the storage space can be saved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pixel-based method of obtaining a downsampled image, wherein a resolution of an original image is 2M*2N, and a resolution of the downsampled image is M*N; the method comprising steps of:
   constructing a virtual image by an image super-resolution technology according to the resolution M*N of the downsampled image, wherein a resolution of the virtual image is 2M*2N;
   determining relational expressions between pixels of the virtual image and pixels of the downsampled image;
   calculating a mean squared error between the pixels of the virtual image and pixels of the original image based on the relational expressions between the pixels of the virtual image and the pixels of the downsampled image;
   determining a coefficient matrix between the pixels of the downsampled image and the pixels of the original pixels under the condition of the mean squared error between the pixels of the virtual image and the pixels of the original image being at a minimum value;
   determining the pixels of the downsampled image according to the pixels of the original image and the coefficient matrix between the pixels of the downsampled image and the pixels of the original image;
   outputting the downsampled image as per the pixels of the downsampled image;
   wherein the step of constructing a virtual image by an image super-resolution technology according to the resolution M*N of the downsampled image comprises: constructing the virtual image by an image super-resolution interpolation method according to the resolution M*N of the downsampled image;
   the step of constructing the virtual image by an image super-resolution interpolation method according to the resolution M*N of the downsampled image comprises:
   setting P1, P2, P3, P4 as pixels of the downsampled image and A, B, C as pixels of the virtual image constructed by the image super-resolution interpolation method, wherein positional relationships among P1, P2, P3, P4, A, B, C are that: A is located at an intersection of a diagonal line connecting P1 and P4 and another diagonal line connecting P2 and P3, B is located at a midpoint of a line connecting P1 and P2, and C is located at a midpoint of a line connecting P1 and P3;
   determining interpolation relational expressions between R, G, B subpixel values of the pixels A, B, C of the virtual image and R, G, B subpixel values of the pixels P1, P2, P3, P4 of the downsampled image as that: A=¼(P1+P2+P3+P4), B=½(P1+P2), C=½(P1+P3);
   determining interpolation relations between R, G, B subpixel values of the pixels of the virtual image and R, G, B subpixel values of the pixels of the downsampled image;
   calculating all the pixels of the downsampled image to construct the virtual image as per the interpolation relations between R, G, B subpixel values of the pixels of the virtual image and R, G, B subpixel values of the pixels of the downsampled image.

2. The method as claimed in claim 1, wherein the step of determining the pixels of the downsampled image according to the pixels of the original image and the coefficient matrix between the pixels of the downsampled image and the pixels of the original image comprises:
   sorting the magnitudes of coefficients between each of the pixels of the downsampled image and all the pixels of the original image according to the coefficient matrix between the pixels of the downsampled image and the pixels of the original image so as to list the magnitudes of coefficients in a sequence from a largest one of the magnitudes of coefficients to a smallest one of the magnitude of coefficients;

picking a number of magnitudes of coefficients in the list by starting from the largest one in a descending order and determining actually used coefficients for each of the pixels of the downsampled image and pixels of the original image corresponding to the actually used coefficients according to a sum of the picked number of magnitudes of coefficients, wherein the number is such that the sum falls within a range of between 0.95 and 1.05;

determining the pixels of the downsampled image according to the actually used coefficients for each of the pixels of the downsampled image and the pixels of the original image corresponding to the actually used coefficients.

3. A pixel-based apparatus of obtaining a downsampled image, wherein a resolution of an original image is 2M*2N, and a resolution of the downsampled image is M*N; the apparatus comprising:

a virtual image constructing module, configured to construct a virtual image by an image super-resolution technology according to the resolution M*N of the downsampled image, wherein a resolution of the virtual image is 2M*2N;

a relational expression determining module, configured to determine relational expressions between pixels of the virtual image and pixels of the downsampled image;

a mean squared error calculating module, configured to a mean squared error between the pixels of the virtual image and pixels of the original image based on the relational expressions between the pixels of the virtual image and the pixels of the downsampled image;

a coefficient matrix determining module, configured to determine a coefficient matrix between the pixels of the downsampled image and the pixels of the original image under the condition of the mean squared error between the pixels of the virtual image and the pixels of the original image being at a minimum value;

a pixel determining module, configured to determine the pixels of the downsampled image according to the pixels of the original image and the coefficient matrix between the pixels of the downsampled image and the pixels of the original image;

an image output module, configured to output the downsampled image as per the pixels of the downsampled image;

wherein the virtual image constructing module is configured to construct the virtual image by an image super-resolution interpolation method according to the resolution M*N of the downsampled image;

wherein the virtual image constructing module comprises:

a setting unit, configured to set P1, P2, P3, P4 as pixels of the downsampled image and A, B, C as pixels of the virtual image constructed by the image super-resolution interpolation method, wherein positional relationships among P1, P2, P3, P4, A, B, C are that A is located at an intersection of a diagonal line connecting P1 and P4 and another diagonal line connecting P2 and P3, B is located at a midpoint of a line connecting P1 and P2, and C is located at a midpoint of a line connecting P1 and P3;

an interpolation relational expression determining unit, configured to determine interpolation relational expressions between R, G, B subpixel values of the pixels A, B, C of the virtual image and R, G, B subpixel values of the pixels P1, P2, P3, P4 of the downsampled image as that $A=\frac{1}{4}(P1+P2+P3+P4)$, $B=\frac{1}{2}(P1+P2)$, $C=\frac{1}{2}(P1+P3)$;

an interpolation relations determining unit, configured to determine interpolation relations between R, G, B subpixel values of the pixels of the virtual image and R, G, B subpixel values of the pixels of the downsampled image;

a virtual image constructing unit, configured to perform calculation on all the pixels of the downsampled image to construct the virtual image as per the interpolation relations between R, G, B subpixel values of the pixels of the virtual image and R, G, B subpixel values of the pixels of the downsampled image.

4. The apparatus as claimed in claim 3, wherein the pixel determining module comprises:

a sorting unit, configured to sort the magnitudes of coefficients between each of the pixels of the downsampled image and all the pixels of the original image according to the coefficient matrix between the pixels of the downsampled image and the pixels of the original image so as to list the magnitudes of coefficients in a sequence from a largest one of the magnitudes of coefficients to a smallest one of the magnitude of coefficients;

an actually used coefficient determining unit, configured to pick a number of magnitudes of coefficients in the list by starting from the largest one in a descending order and determine actually used coefficients for each of the pixels of the downsampled image and pixels of the original image corresponding to the actually used coefficients according to a sum of the picked number of magnitudes of coefficients, wherein the number is such that the sum falls within a range of no between 0.95 and 1.05;

a pixel determining unit, configured to determine the pixels of the downsampled image according to the actually used coefficients for each of the pixels of the downsampled image and pixels of the original image corresponding to the actually used coefficients.

* * * * *